United States Patent [19]
Miller

[11] 3,756,091
[45] Sept. 4, 1973

[54] POSITIVE POWER TRANSMISSION SYSTEM

[75] Inventor: Henry F. Miller, Clifton, N.J.

[73] Assignee: Uniroyal, Inc., New York, N.Y.

[22] Filed: Feb. 19, 1970

[21] Appl. No.: 12,870

Related U.S. Application Data

[63] Continuation-in-part of Ser. No. 778,518, Nov. 25, 1968, abandoned.

[52] U.S. Cl................. 74/231 C, 74/243 R, 74/462
[51] Int. Cl...... F16g 1/28, F16h 55/30, F16h 55/06
[58] Field of Search.............. 74/462, 231 R, 231 C, 74/243 R, 229

[56] References Cited
UNITED STATES PATENTS
2,534,679   12/1950   Place ................................... 74/229
2,753,980   7/1956   Ballard.......................... 74/243 R X
3,404,576   10/1968   Cicognani et al............. 74/231 C X FOREIGN PATENTS OR APPLICATIONS
1,056,041   1/1967   Great Britain........................ 74/462

Primary Examiner—Leonard H. Gerin
Attorney—Steven H. Bazerman

[57] ABSTRACT

A toothed power transmission belt and pulley system is disclosed wherein the belt has an endless substantially inextensible tensile member with teeth secured thereto, the teeth having a cross-sectional configuration composed of two circular intersecting arcs for meshing with mating, conjugate, curvilinear pulley teeth. The size of teeth, length of radii of curvature, and the angles and point of intersection are determined by a set of design criteria and formulas as recited herein.

42 Claims, 12 Drawing Figures

Patented Sept. 4, 1973
3,756,091
6 Sheets-Sheet 1
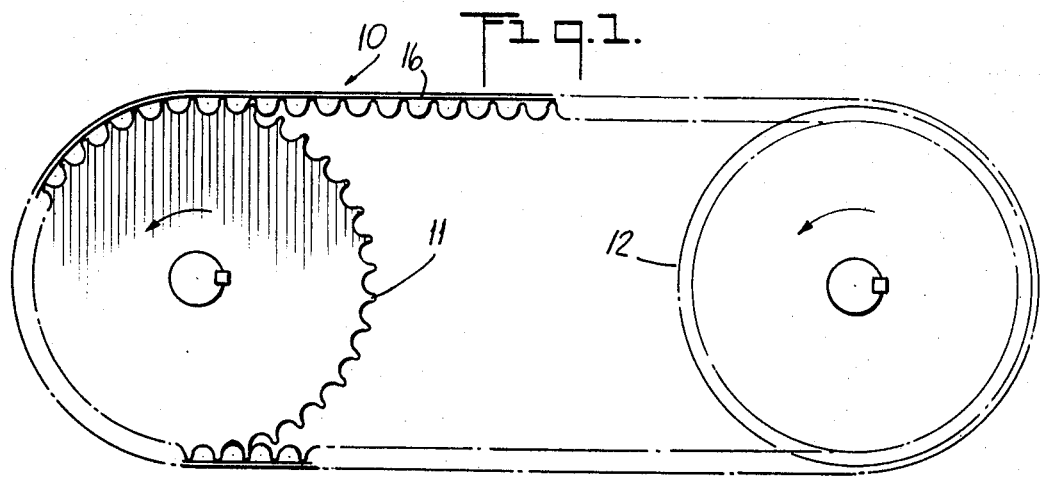
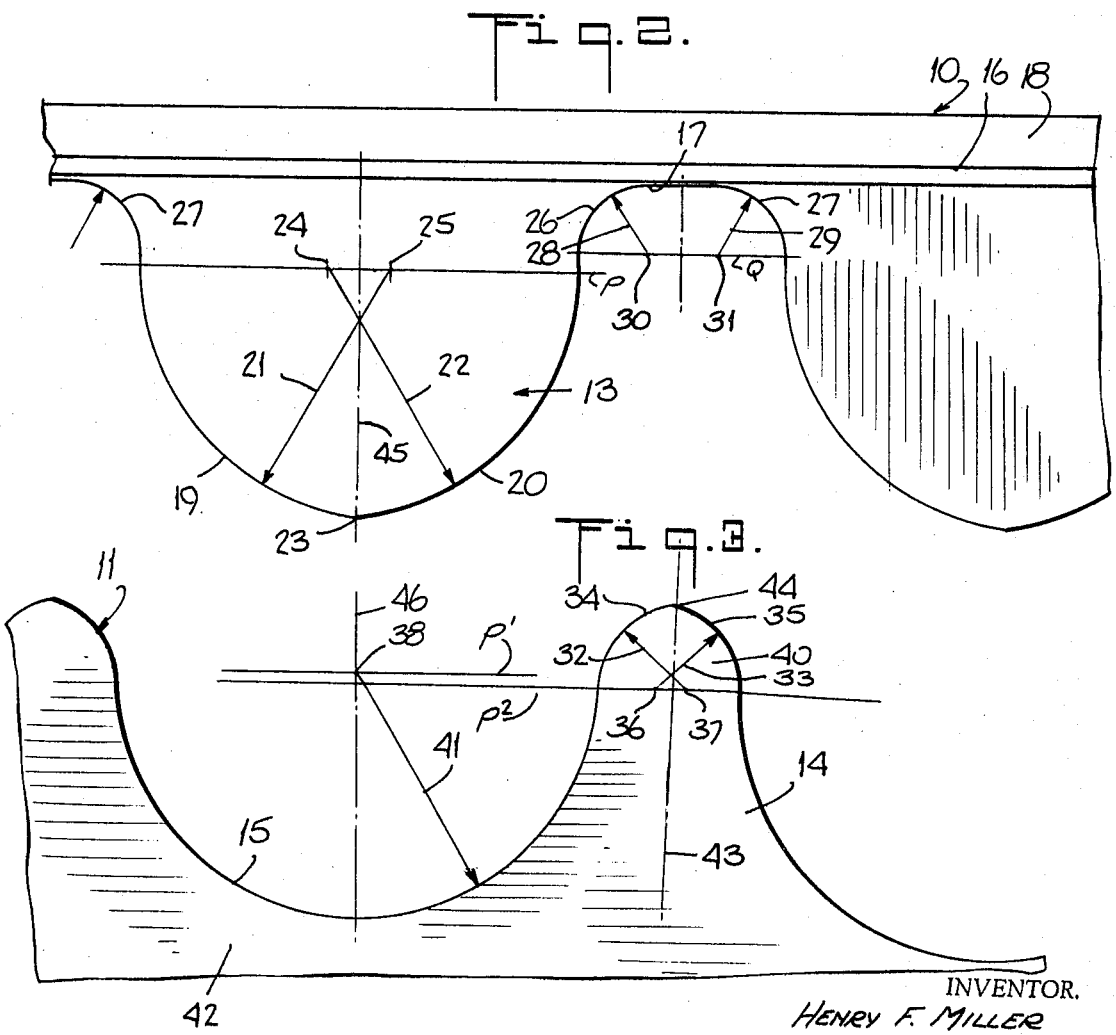
INVENTOR.
HENRY F. MILLER
BY
Steven Bagerman
ATTORNEY

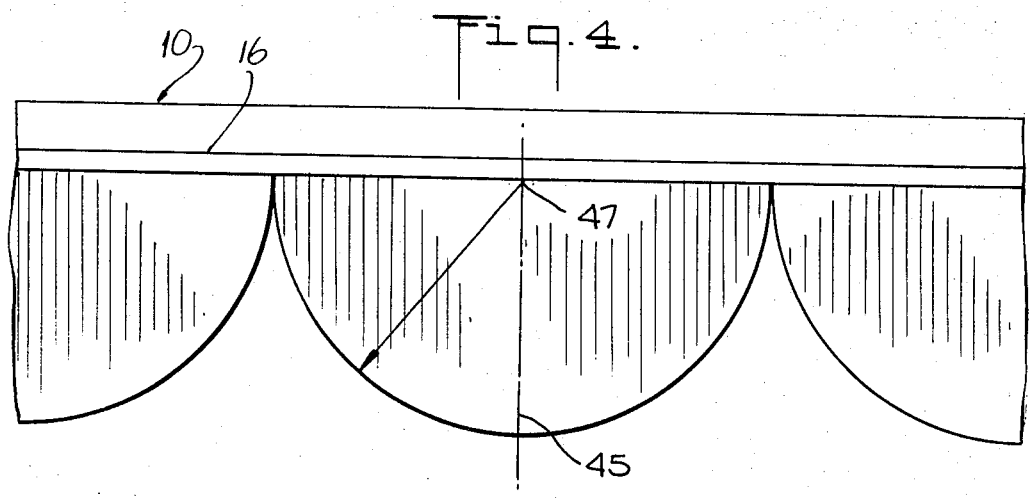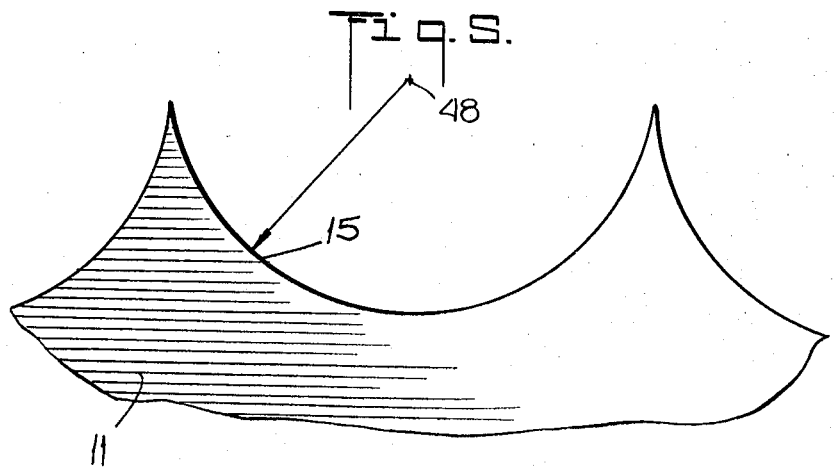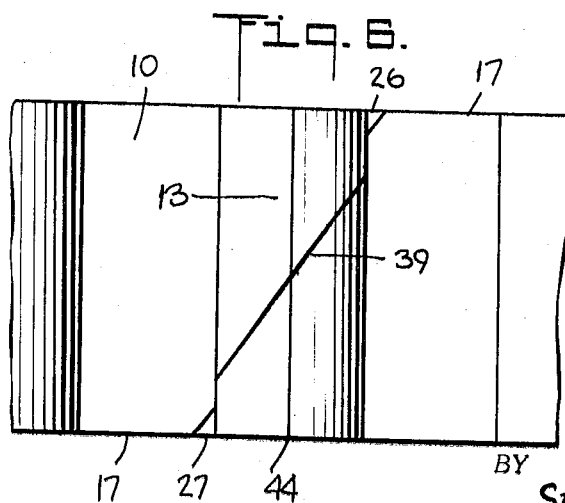

INVENTOR
HENRY F. MILLER

INVENTOR
HENRY F. MILLER
BY
Steven Bazerman
ATTORNEY

3,756,091

POSITIVE POWER TRANSMISSION SYSTEM

This application is a continuation-in-part of application Ser. No. 778,518 filed Nov. 25, 1968, now abandoned.

This invention relates to a toothed power transmission belt and pulley drive.

U.S. Pat. No. 2,507,852, issued on May 16, 1950 to R. Y. Case describes in detail a power transmission belt comprising an inextensible tensile member having teeth bonded to one side and a protective jacket fabric covering the teeth. The teeth are preferably made of an elastomeric material, such as rubber, and the belt may also include a backing layer identical, or similar, to the material of which the teeth are constructed.

Many different elastomeric materials have been utilized for the construction of belts made in accordance with the above cited patent, some of the more common materials being neoprene and polyurethane. These belts are designed to mesh with toothed pulleys that are constructed of material having a higher Young's modulus than the elastomeric material used for the construction of the belt. The conventional toothed belt, as described in the patent to Case, utilizes a tooth cross-sectional configuration that is essentially trapezoidal and which is very similar to a conventional rack tooth. Many attempts have been made to alter the belt and pulley teeth configurations to relieve the problem of belt failure, such as tooth shear, resulting from stress concentration in the belt.

The region of highest strain in a trapezoidal belt tooth is in the region of the tooth root on the side where power is transmitted. This high strain region covers only a relatively small portion of the total tooth volume (i.e., 20-30 percent). As a result the elastomeric material is used inefficiently and the transfer of load from the belt tooth to the tensile member takes place non-uniformly along the belt tooth-tensile member interface. To increase the horsepower capacity of a toothed belt without experiencing this associated problem of tooth shear, it is necessary to lower the strain level developed in the belt teeth and obtain a more uniform transfer of load from the tooth to the tensile member. Dynamic strain studies also have shown that an interference problem exists as trapezoidal belt and pulley teeth come into engagement. The outer corners of adjacent belt and pulley teeth tend to overlap as a result of insufficient tooth clearance and deformation within the belt due to loading. As a result, the mating teeth slide into contact over the entire length of the belt tooth face creating an undesirable amount of tooth wear and heat. This interference also induces transverse oscillations in the belt which serve as a source of noise and flex fatigue.

The configurations of the belt and pulley teeth according to the present invention are designed to overcome many of the difficulties encountered with the trapezoidal tooth design. It has been found that if the belt teeth have a cross sectional configuration which approximates the contour of the ½ order isochromatic fringe in a belt tooth under rated load as defined herein, if the pulley teeth have mating, substantially conjugate, curvilinear cross-sections, and if the size of the teeth, radii of curvature and the angles and points of intersection of the teeth conform to the set of criteria and formulae herein, the resulting belt and pulley system will have improved performance characteristics when compared to the trapezoidal belt drives. With such an improved configuration the strain level in the belt teeth will be relatively low with no stress concentration areas; there will be a more uniform transfer of load from the belt teeth to the tensile member across the entire belt tooth-tensile member interface; the belt teeth will not "jump" out of the pulley grooves; and the interference between the teeth will be kept to a minimum.

The following is a brief description of the drawings and a detailed description of the belt and pulley tooth construction which best utilizes the above principles and thus provides a superior power transmission drive.

FIG. 1 is a longitudinal cross sectional view looking transversely of the preferred embodiment of the positive drive of this invention with the belt shown in engagement with its cooperating pulleys;

FIG. 2 is an enlarged fragmentary longitudinal cross sectional side view of the belt of the preferred embodiment of this invention;

FIG. 3 is an enlarged fragmentary longitudinal side view of the mating pulley for the belt of the preferred embodiment of this invention as shown in FIG. 2;

FIGS. 4 and 5 are enlarged fragmentary longitudinal cross sectional views showing another specific embodiment of a belt and its mating pulley respectively according to this invention;

FIG. 6 is a bottom view of the belt of FIG. 2;

Figure 8:
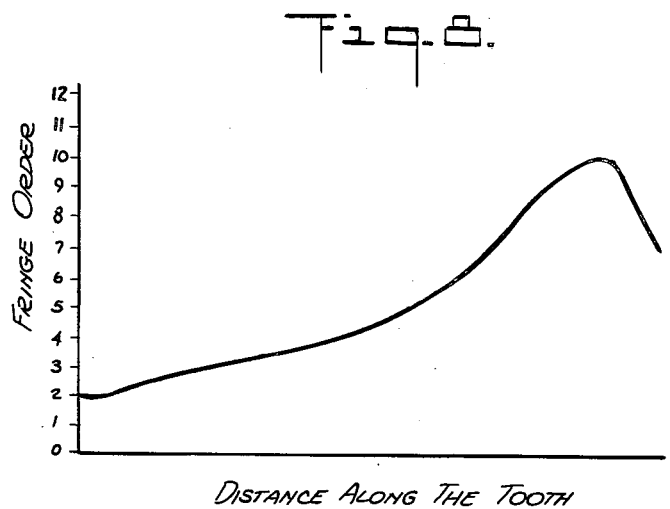
FIG. 8 is a graph showing the variation in isochromatic fringe order in a trapezoidal belt tooth under rated load along a longitudinal line connecting the tips of adjacent pulley teeth versus distance along said line.

As seen in FIG. 1, the endless belt 10 of the invention engages the driving and driven pulleys 11 and 12. Belt 10 is provided with a tensile member 16 comprising a plurality of turns of a continuous strand of filamentary material. The tensile member 16 carries substantially the entire working load imposed upon the belt 10, and up to the maximum load for which the belt is designed, the tensile member 16 is substantially inextensible. The above-cited U.S. Pat. No. 2,507,852 to Case may be consulted for a more detailed description of the principles of this toothed belt and pulley system. is substantially inextensible. The above-cited U.S. Pat. No. 2,507,852 to Case may be consulted for a more detailed description of the principles of this toothed belt and pulley system.

The preferred embodiment of the improved belt is illustrated in FIGS. 2 and 3, wherein a belt 10 is constructed with belt teeth 13 and a backing layer 18. The inextensible tensile member 16 is embedded in the belt approximately at the roots 26 and 27 of the teeth 13. A protective jacket (not shown) may be incorporated in the belt construction to extend over the entire toothed surface of the belt. A thin layer of elastomer (not shown) between the jacket and tensile members 16 may be added to improve adhesion in the land area 17 of the belt. Teeth 13 as seen in the sectional view of FIG. 2 are constructed so that the curvilinear outermost portions thereof have a longitudinal cross sectional configuration which is constant across the transverse cross section of the belt and which is substantially composed of two circular arcs 19 and 20 of equal radius 21 and 22 crossing at point 23 on center line 45 of the tooth cross section (the cusped nature of their intersection being exaggerated in the drawing). The centers of curvature 24 and 25 of radii of the circular arcs 19 and 20 forming the sides of the tooth are located on a line P that extends substantially parallel to the tensile member 16 in the longitudinal direction when the tensile member is linearly positioned as illustrated. The circular arcs extend from the point 23 to the line P. The centers of curvature for the right and left side of the tooth are displaced on opposite sides of the center line 45 of the tooth 13 from their corresponding arcs by an amount equal to or less than 10 percent of the radii of curvature 21 and 22 of the circular arcs. The land area 17, between adjacent teeth 13, is a small straight section parallel to line P connecting the ends of the tooth roots 26 and 27 adjacent to the tensile member 16. Line P is spaced from the land area by an amount less than or equal to 40 percent of the total tooth depth which is the distance along line 45 between point 23 and the intersection of line 45 with an extension of the plane of the land area 17. The surfaces of the roots 26 and 27 of the belt teeth viewed on cross section are circular arcs having equal radii 28 and 29. The centers of curvature 30 and 31 of root radii 28 and 29 are located on a line Q situated between the land area 17 of the teeth and point 23 by a distance equal to or less than the distance from the plane of the land area to line P measured along the center line 45 of the tooth 13. The arcs of the roots 26 and 27 begin at line Q and end at land area 17. When the centers of curvature 30 and 31 are located on a line Q spaced from line P, the tooth arcs 19 and 20 and their respective adjacent root arcs 27 and 26 are connected by straight lines tangent to these arcs at the point of their intersection with the lines P and Q, respectively.

The pulleys 11 and 12 as seen in FIG. 3, each comprise a body portion 42 having a curvilinear teeth 14 separated by curvilinear cavities 15. The tooth tip 40 viewed in longitudinal cross section has an outer configuration which is composed of two circular arcs 34 and 35 meeting at point 44 on center line 43 of the tooth cross section. Arcs 34 and 35 have two equal radii 32 and 33 with centers of curvature 36 and 37 displaced equal amounts on opposite sides of the center line 43 of the tooth 14 from their corresponding arcs. The displacement is equal to 30 percent or less of the tip radii 32 and 33. Both centers of curvature are within the gear tooth. The cross sectional configuration of cavity 15 has a much larger radius 41 whose center 38 is outside the gear body 42. The centers of radii 36, 37 and 38 are located on the same or slightly spaced circles $P^1$ and $P^2$ which are concentric with and within a circle connecting the outermost points 44 of the tooth tips and spaced from this circle by a radial distance equal to or less than 30 percent of the total tooth depth. The total tooth depth is the radial distance between point 44 and a circle connecting the innermost points of cavities 15. Alternately, the centers of curvature 36 and 37 may be displaced equal amounts on the same side of the center line 43 as their corresponding arcs (not shown), the arcs would then be connected by a straight or slightly curved section forming the outermost portion of the tooth tip.

If a jacket is used with a belt having this construction there is a tendency for those splices of the jacket which lie entirely in the root and land area of a belt tooth to break in use caused by the reduced strength of the jacket. This is in turn due to the lack of bonding strength of the elastomer to the jacket in this region. To eliminate this problem the jacket splices 39 should be bias cut (as seen in FIG. 6) so that the minimum angle that the splice makes with the belt side is such that if the splice starts at the point where the root of a tooth blends with its land area it will end, when viewed in cross section, at the equivalent blend point on the other side of the same tooth and preferably the splice is at such an angle that the splice spans two teeth. This obviates the possibility of a premature failure due to the presence of a square cut splice wholly located in the belt root and land area.

The shape of the belt teeth 13 and pulley teeth 14 are important aspects of the invention. With conventional (i.e., trapezoidal) belt shapes the strain is concentrated in a relatively small volume in the region of the root of the belt teeth, the outer corners of the teeth are unstrained when the teeth are fully engaged with the pulley teeth; there is a non-uniform load transfer from the belt teeth to the tensile member; and there is interference between the outer corner of the belt and pulley teeth during engagement. This unfavorable strain pattern and interference results in an inefficient belt having a comparatively short life. Much of the elastomeric material is unneeded, essentially carrying little or none of the load.

To increase the efficiency of the toothed belt such strain concentration, non-uniform transfer of load to the belt tooth-tensile member interface and tooth interference should be elimanated. A belt having the contours set forth in this invention recited above can eliminate such inefficiency, as well as other design faults of conventional belts, if the dimensions of the teeth, radii and angles and the points of intersection are correctly chosen. If the following criteria are adhered to, the resulting belt and pulley drive will have a longer life, increased load carrying capacity, lower noise level and increased efficiency in use.

1. The belt and pulley should be made such that when their curvilinear surfaces are in contact but not under any load the radius of curvature of a pulley tooth at any given point should be greater than the radius of curvature of the mating belt tooth at that point by not more than 10 percent. Preferably the radius of curvature of each differential element of the pulley tooth should be greater than that of the mating belt tooth by approximately 4 percent.

2. The radius of curvature of the root of the belt tooth should be selected and positioned so that a line drawn tangent to the belt tooth at the point where the tooth root blends into the main portion of the tooth makes an angle of less than 30° with the center line 45 of the tooth. The optimum angle would be approximately 5°. This is to prevent the belt teeth from jumping out of engagement with the pulley teeth.

3. The radii of curvature of the tip of the pulley tooth should be selected and positioned so that a line drawn tangent to the curvilinear pulley tooth at the point where the external tip curvature blends into the main portion of the tooth makes an angle of less than 30° with a line of symmetry 46 drawn through the center of the tooth cavity. This is also to prevent the belt teeth from jumping out of engagement. The preferable angle would be approximately 9 degrees when the belt tooth, as recited in the preceding paragraph, has an angle of 5°.

4. The root radius of the belt teeth should be less than 95 percent of the tip radii of the pulley teeth so that when the belt is under rated load there is no contact between the belt in the regions of the roots of the belt teeth and the tips of the pulley teeth thereby eliminating stress concentrations at the roots of the belt teeth. The optimum root radius is 82 percent of the tip radius.

5. The width of a belt tooth, as measured between the ends of the belt tooth roots which are closest to the tensile member, should be as small as possible to obtain a more uniform load across the entire belt tooth in the region of the belt tooth-tensile member interface. The minimum (and thus optimum) size is governed by the following formula:

$$L = [2T\ (F.S.)_S]_1[\pi\ S\ dcN\ (F.S.)_T]$$

where $L$ = tooth width between roots of the same tooth required at the belt tooth-tensile member interface measured in inches.

$T$ = desired tensile capacity of belt measured in pounds/inch of belt width.

$d$ = tensile member diameter measured in inches.

$c$ = number of tensile members/inch of belt width.

$N$ = minimum number of belt teeth in contact with the pulley.

$(F.S.)_S$ = factor of safety for belt tooth-tensile member bond at a service factor of one.

$(F.S.)_T$ = factor of safety for the tensile member at a service factor of one.

$S$ = maximum shear stress that can be developed at the belt tooth-tensile member interface before separation, measured in pounds/square inch.

The factors of safety $(F.S.)_S$ and $(F.S.)_T$ normally would in commercial use both have the value of 17. Thus in the above equation, having equal value, they would cancel each other out and therefore may be disregarded in calculating $L$.

6. The maximum number of belt teeth per unit belt length should be used. This is determined by the strength of the belt and pulley teeth and the desired rated load. After selection of the tooth width as described above, taking into account the tensile capacity desired $T$, a standard stress analysis is performed on a pulley tooth considered as a cantilever beam of variable cross-section. From this, the minimum width of a pulley tooth which will not fail under the desired tensile capacity $T$ can be found and this in turn determines the minimum pitch of the belt, i.e., the maximum number of teeth per unit belt length. The number of belt teeth is maximized thereby maximizing the amount of elastomeric material which is transmitting the load from the pulley to the tensile member.

7. The clearance between the outer tip 23 of the belt tooth and the pulley cavity 15 should not be more than 10 percent of the total pulley tooth depth. This is to minimize tooth interference and maximize the amount of contact surface between the belt and pulley teeth by making the belt teeth occupy as much of the curvilinear cavities 15 as possible. The preferred embodiment is from a line to line contact to a 2 percent clearance.

8. The selection of the radii of curvature of the belt teeth should be such that the curvilinear contour of the outer end of the tooth approximately matches the contour of the ½ order isochromatic fringe in the belt as defined hereafter.

9. Finally, taking into account all the above criteria the resulting belt should be able to engage and disengage without interference. Such non-interference can be obtained by first designing a toothed configuration which conforms to the above criteria and then forming a corresponding non-interfering mating tooth with the geometrical generation of a conjugate form of the first tooth. The conjugate form is that tooth form which corresponds to the volume between the belt and pulley which is not swept out by the first tooth as the belt moves into contact with the pulley. This can be determined graphically. It may be advantageous to have the second tooth deviate from a true conjugate by the removal of additional material in order to eliminate contact in the root area of the tooth as recited in criteria 4. Of course all dimensions of the resulting conjugate should be within the above criteria.

As a detailed example of a drive designed in accordance with the criteria set forth in this invention, the dimensions of a 14mm pitch belt and pulley design in accordance with this invention are as follows:

| Belt Tooth (all dimensions are in inches) | |
|---|---|
| Tooth width (end of root 26 to end of root 27) | 0.4542 |
| Distance between the land area 17 and line P | 0.0700 |
| Distance between the land area 17 and line Q | 0.0525 |
| Tooth radii 21 and 22 | 0.1790 |
| Distance between centers of curvature 24 and 25 of the tooth | 0.0125 |
| Root radii 28 and 29 | 0.0525 |
| Length of land area 17 | 0.0970 |
| Pulley Tooth | |
| Tip Radii 32 and 33 | 0.0640 |
| Distance between centers of curvature of the tip radii 36 and 37 | 0.0180 |
| Distance between P¹ and P² | 0.0068 |
| Cavity radius 41 | 0.1875 |
| Pulley diameter | 7.2690 |

This belt of course meets with all the design criteria 1-9 listed above. To more fully illustrate, let us compare this specific example with the criteria.

The radius of the belt teeth is 95.5 percent of the radius of the pulley teeth; thus the difference of 4.5 percent is well within the range of 10 percent indicated in criterion number 1. The tangent lines to the curvilinear profiles as indicated in criteria 2 and 3 are 5°15′ and 9°10′ for the belt and pulley respectively. The root radius of the belt tooth is 82 percent of the tip radius and thus below 95 percent as required by criterion 4. The tooth width has been minimized as set forth in criterion 5 as can be seen by comparing the width of the teeth of the 14mm belt according to the present invention with the teeth of an equivalent heavy duty conventional belt having 1¼ inch pitch trapezoidal teeth. The 1¼ inch conventional belt has a tooth width of 0.9 inches and thus the design of the present invention has a little more than half the belt tooth width of the conventional tooth. In a similar comparison as to the number of teeth, the invention has 2.27 times as many teeth as the conventional trapezoidal toothed belt (i.e., the ratio of the pitch is 1.25/0.5512 or 2.27/1). The clearance between the outer tip of the belt tooth and the pulley cavity is well within the 10 percent limit of criterion 7. The radius of curvature of the belt tooth is such that the curvilinear contour of the tooth approximately matches the ½ order isochromatic fringe as defined hereafter as required in criterion 8. Finally the pulley tooth configuration is substantially the conjugate of the belt tooth configuration.

Although the belt illustrated in FIG. 2 may be made in any number of ways, it is preferable to take advantage of the unique method described in the U.S. Pat. No. 3,078,206, which issued on Feb. 19, 1962 to W. A. Skura. The method described in the above cited patent comprises the manipulative steps of wrapping a jacket fabric (which may or may not be used with the subject invention) around a grooved mold; winding a tensile member over the jacket; wrapping a layer of neoprene rubber over the tensile member and into the grooves of the mold to form the belt teeth. If a jacket fabric is utilized, the fabric is stretched by the molded rubber and conforms to the contour of the mold groove. An alternative method for the manufacture of belt 10 is thoroughly described in the above cited U.S. Pat. No. 2,507,852.

A modification to the above method which has resulted in improved performance is the addition of a thin layer of elastomer (approximately 0.010 inch thick) between the jacket (not shown) and the tensile member 16 to improve adhesion in the land area. The thin layer is applied to the jacket in the form of a sheet just prior to wrapping the tensile member. The elastomer used for the thin layer is the same as that used in the belt tooth.

Figure 9:
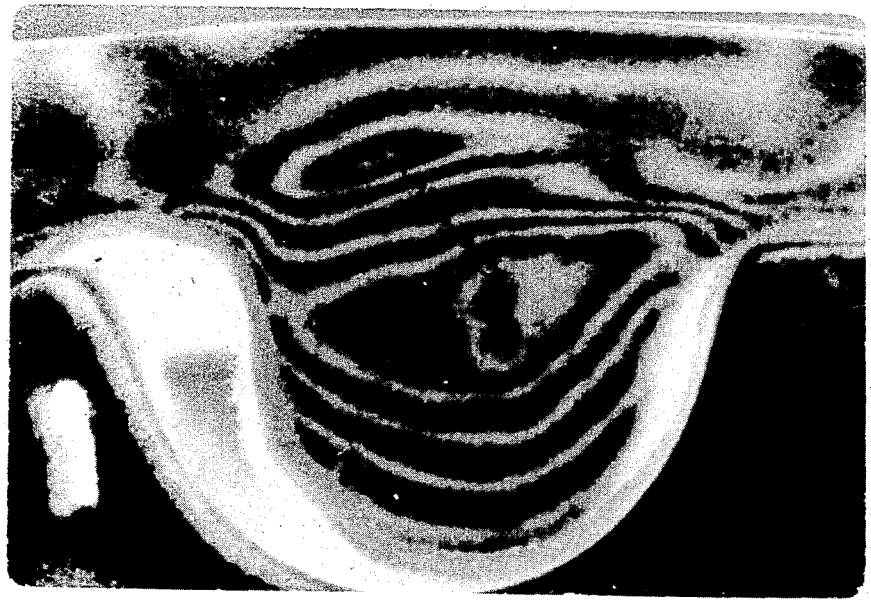
FIG. 9 is a photograph of the isochromatic fringe pattern of a belt tooth constructed according to the present invention under load.
Figure 11:
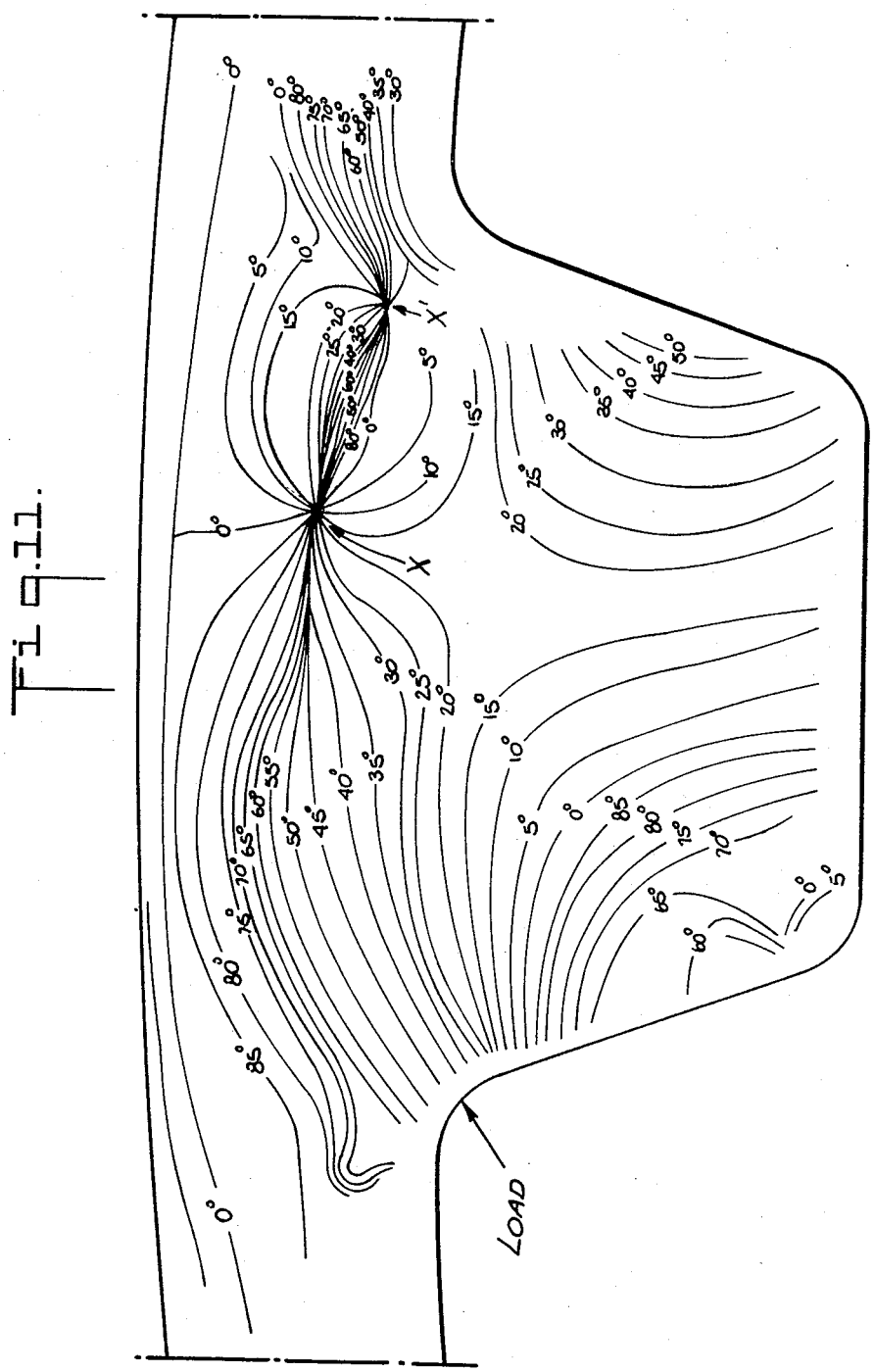
FIG. 11 is a diagram showing the isoclinic fringe patterns in a trapezoidal tooth under load.

The above described belt and pulley construction is far superior to the conventional trapezoidal toothed belt and pulley system which has traditionally been used. Static and dynamic photoelastic strain studies have been performed using belts fabricated in accordance with this invention and the performance compared with other standard toothed belts. In photoelastic studies the strain field is described by two families of fringes, namely, the isochromatics and the isoclinics. Isoclinic fringes as seen for example in FIG. 11 are the locus of points along which the directions of the principal strains are constant. Isochromatic fringes as seen for example in FIG. 9 are the locus of points along which the magnitude of the principal strain difference is constant. The isochromatic fringes, which appear in a shaped test piece of photoelastic material attached to the belt to be tested viewed in properly polarized light, are related to the principal strain differences (i.e., the maximum principal strain at the point in the fringe minus the minimum principal strain at that point) by a constant, $f$, called the strain optical factor. This factor is characteristic of the photoelastic material used in the strain study i.e., the strain necessary to produce one fringe in this material. For example the first order fringe in the test piece would have a principal strain difference of $f$ while the second order fringe would have a principal strain difference of $2f$ and so on until the highest fringe order in the test piece under a given load is reached.

Figure 7:
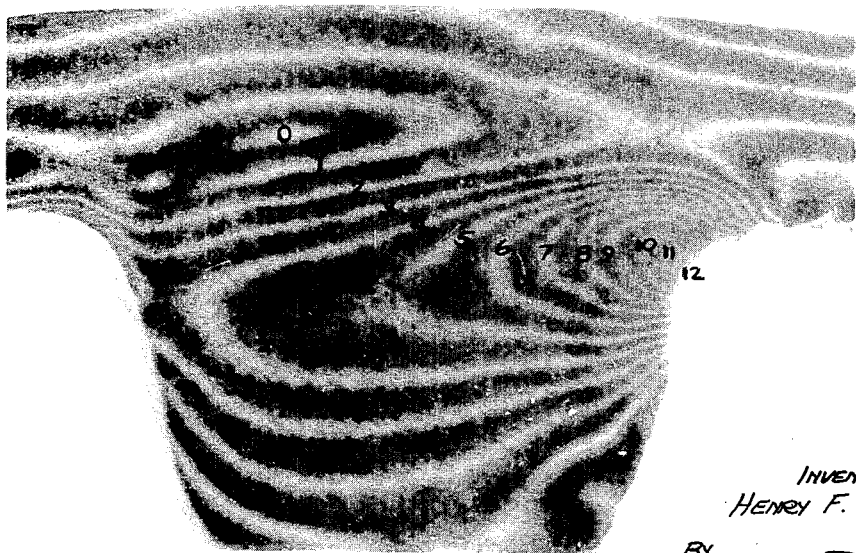
FIG. 7 is a photograph of the isochromatic fringe pattern of a conventional trapezoidal belt tooth under rated load.

To evaluate the performance of the curvilinear tooth configuration described in this patent, experiments were conducted wherein equal torque loadings were applied to trapezoidal and curvilinear teeth. An 80 mill layer of photoelastic material having a strain optical sensitivity of 0.005 was applied to the test belt and the tests were carried out such that the strain optical factor $(f)$ as heretofore described was 2.90 percent. Thus throughout the specification and the claims when a given fringe order or line is referred to in a belt, it is arrived at by examination of the corresponding fringe on a photoelastic material applied to the belt and tested under conditions such that the photoelastic material will have a strain optical factor $(f)$ of 2.90 percent. In each case the length of the belt subjected to load was the same; i.e., the length of toothed engagements with the pulleys was the same. FIGS. 7 and 9 show the isochromatic fringe patterns developed in the trapezoidal and curvilinear belt teeth. It should be noted that since the outer edge of the photoelastic coating is bevelled and shaped so as to prevent direct contact between the pulley tooth and the coating, a portion of the strain patterns in the tooth cannot be seen in FIGS. 7 and 9. It should also be noted that the edge of the pulley teeth casts a shadow in the region of the contact between the belt and pulley teeth and thus obscures a portion of the strain pattern at that point. From FIG. 7 for the trapezoidal tooth, we see that:

1. There is a concentration of strain in the region of the tooth root. In addition to the high strain magnitude, the strain gradient is high (i.e., the strain is changing rapidly with respect to the tooth dimensions). This, of course, is detrimental to the performance of the belt. Note that the maximum fringe order developed is in excess of 12.

2. The region where the concentration of strain exists covers only a small portion of the total area of the longitudinal cross-sectional surface of the tooth. This means that a small portion of the trapezoidal tooth is very highly strained, and the remainder of the tooth is relatively lightly strained. The result is a poor distribution of strain within the belt tooth.

3. The load distribution in the region of the tensile member is not uniform across the width of the tooth. This can be seen by drawing a line joining the tips of adjacent pulley teeth (in the region of the tensile member) and plotting the isochromatic fringe order at each intersection with the line as shown in FIG. 8. Note the very high, rapidly changing peak in the vicinity of the strain concentration and the relatively low value across the remainder of the tooth. This indicates a very nonuniform distribution of load to the tensile member.

4. The elastomer at the outer corners of the tooth is unloaded and can be removed to save material.

By comparison as shown in FIG. 9, the isochromatic fringe pattern for the belt tooth of the present invention reveals:

1. No strain concentration in the region of the tooth root on the side of the tooth that contacts the pulley tooth. The lack of closely spaced fringes emanating from a point indicates that there are no areas of strain concentration within the tooth. The maximum fringe order developed is 5 against 12 for the trapezoidal tooth (see FIGS. 7 and 9). This, of course, results in improved performance.

2. Unlike the trapezoidal tooth, there are no relatively highly strained areas in the tooth of the present invention. This indicates that the elastomer in the entire tooth is being used efficiently.

Figure 10:
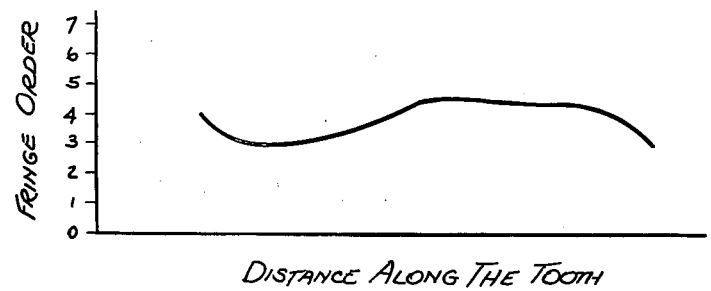
FIG. 10 is a graph showing the variation in isochromatic fringe order in a belt tooth constructed in accordance with the present invention under load along a longitudinal line connecting the tips of adjacent pulley teeth versus distance along said line.

3. The load transfer to the tensile member is very efficient. This can be seen by noting the intersection of the various fringes with a line joining the tips of adjacent pulley teeth (i.e., approximately the region of the tensile member) as shown in FIG. 10. Note that fringe No. 3 covers almost the entire tooth in the region of the tensile member.

4. The first order Fringe (also the ½ order fringe which falls between fringe order 1 and the outer edge of the tooth, not shown) has substantially the same curvature as the geometry of the end of the tooth indicating that all excess elastomer has been removed from the end of the tooth.

Figure 12:
FIG. 12 is a photograph of the 60° isoclinic fringe of a belt tooth constructed according to the present invention.

The isoclinic fringe patterns developed in the trapezoidal and the belt teeth of the present invention are shown in FIGS. 11 and 12, respectively.

FIG. 11 is a diagram showing isoclinic fringes in a trapezoidal tooth. These are marked 0° through 85° in 5° intervals and intersect at the two points X and X' in the tooth. It should be noted that the region of the belt tooth below the line joining the tips of adjacent pulley teeth is covered by all isoclinic values from 0° to 85°. Further, the isoclinics on the side of the tooth in contact with the pulley tooth converge toward a region near the tip of the pulley tooth. This indicates a concentrated load being applied to the belt tooth by the pulley tooth in the region of the pulley tip. Further, since all isoclinics from 0° to 85° are present in the tooth, the directions of the principal strains vary from point to point within the tooth.

By comparison, FIG. 12 shows the isoclinic fringe pattern developed in the curvilinear tooth. The broad white area is the isoclinic. It should be noted that the 60° isoclinic covers almost the entire area of the tooth below a line joining the tips of adjacent pulley teeth. This means that there is no concentrated load applied to the belt tooth. It is rather, a distributed load applied across the entire contact face of the belt and pulley teeth. The fact that a single isoclinic (namely the 60° isoclinic) covers practically the entire tooth area also means that the principal strains throughout the belt tooth are in substantially the same direction.

With this background of the meaning of the isochromatic and isoclinic fringe patterns, let us consider once again the transfer of load from the belt tooth to the tensile member. The following equation is used for calculating shear strain $\gamma\theta$ along the belt tooth-tensile member interface, from the maximum principal strain difference $Ep-Eq$ where $Ep$ is the maximum principal strain at the point in question and $Eq$ is the minimum principal strain at the same point (i.e., the isochromatic fringe order) and the angle $\theta$ (i.e., the isoclinic fringe value):

$$\gamma\theta = (Ep - Eq) \sin 2\theta$$

For the trapezoidal tooth, both the isochromatic ($Ep-Eq$) and the isoclinic ($\theta$) fringe values change greatly across the width of the tooth on a line joining the tips of adjacent pulley teeth. Thus, the shear strain in the direction of the tensile member, $\gamma\theta$, at the belt tooth-tensile member interface varies considerably across the width of the entire belt tooth.

For the tooth of the present invention, the isochromatic fringe order in the vicinity of the tensile member is substantially constant across the entire width of the tooth (see FIG. 10). In addition, the 60° isoclinic fringe covers substantially the entire tooth (see FIG. 12). Therefore, the shear strain in the direction of the tensile member is substantially constant along the entire tooth at the belt tooth-tensile member interface.

For example, $\gamma\theta$ has been calculated along a line joining the tips of adjacent pulley teeth for both the trapezoidal and curvilinear teeth. The results are as follows: For trapezoidal teeth:

| $\theta$ (Degrees) | $Ep - Eq$ (Fringes) | $\gamma\theta$ (Fringes) |
|---|---|---|
| 50 | 6.0 | 5.91 |
| 45 | 7.0 | 7.00 |
| 40 | 8.0 | 7.88 |
| 35 | 7.8 | 7.33 |
| 30 | 7.5 | 6.49 |
| 25 | 7.0 | 5.36 |
| 20 | 5.0 | 3.21 |
| 20 | 4.0 | 2.57 |
| 20 | 3.0 | 1.93 |
| 15 | 2.6 | 1.30 |
| 10 | 2.5 | 0.86 |
| 5 | 2.0 | 0.35 |
| 35 | 2.0 | 1.88 |

For teeth according to this invention:

| $\theta$ (Degrees) | $Ep - Eq$ (Fringes) | $\gamma\theta$ (Fringes) |
|---|---|---|
| 60 | 3.0 | 2.59 |
| 20 | 2.5 | 2.16 |

Hence, for the trapezoidal tooth, $\gamma\theta$ varies by a factor of $7.88/0.35 = 22.7$ across the tooth, whereas for the tooth of the present invention $\gamma\theta$ varies by a factor of $2.59/2.16 = 1.2$. This points out very graphically the gross difference in the manner in which the load is transferred from the belt tooth to the tensile member in the trapezoidal teeth and the teeth of the present invention.

Other tests have shown that curvilinear teeth meeting the above criteria will jump out of the pulley grooves only at a higher torque loading than with conventional teeth; that localized stress concentration within the belt teeth is eliminating through the prevention of contact between the belt and pulley teeth in the region of the belt tooth radius; and that curvilinear belt and pulley teeth designed as shown engage with a minimum of interference in comparison with a conventional belt. Testing of the drive of the present invention indicates at least a twofold increase in life at a given load and speed.

Referring to FIG. 4, another embodiment having a belt with a pitch value equal to the tooth width measured on plane P is illustrated. Since pulley teeth are made of much stronger material having a higher Young's modulus than the elastomeric material used in belt teeth the carrying capacity of the belt is improved by approaching as closely as practical the condition where the belt teeth are as strong as the pulley teeth. This condition can be achieved by making the pulley teeth of a relatively small circumferential dimension as compared with the belt teeth. The result is an increase in the belt tooth shear area per inch of belt length. Thus to increase capacity the area of the land between belt teeth should be minimized, as discussed in criterion 6, i.e., the ratio of land area to belt tooth shear area would be minimized. In the present invention the lower limit for the ratio of land area to belt tooth shear area is illustrated in FIG. 4. A belt tooth 13 is constructed having either a single center of curvature 47 (i.e., the distance between the centers of radii 24, 25 of FIG. 2 is zero,)

or one having a double center as in FIG. 2 located on line P which may be co-extensive with the tensile member 16. The tooth width measured along the tensile member 16 is equal to the pitch of the teeth in this construction. The teeth form the entire toothed area i.e., there are no land areas such as 17 and adjacent teeth are contiguous with the tensile member. As seen in FIG. 5 the mating conjugate pulley teeth 14 are formed by the intersection of circular arcs 15 having their centers of curvature 48 outside the body of the pulley 42. This design is considered to be the lower practical limit of the tooth pitch since any further decrease in the pitch would increase the angle between the line of symmetry of the tooth and the tangent line connecting the tooth root radius and the curvilinear portion of the main body of the tooth to the point where the belt tooth would tend to jump out of the pulley grooves.

Another modification of the belt and pulley according to the invention would be the use of a single center of radius (i.e., the distance between the center of radii 24 and 25 is zero in the belt of FIG. 2) but otherwise having the same land the separation configuration or having semicircular land areas similar to that of the pulley teeth of FIG. 3. These embodiments are not illustrated. Further, the circular arcs which form the cross-sectional congiguration of the belt tooth can be replaced by other substantially similar curvilinear arcs which would approximate the line of equal maximum shear strain of lowest magnitude in a belt tooth (for example elliptical arcs). The belt could also be made asymmetrical without destroying the advantages of the present invention.

While there has been described what is at present considered to be preferred embodiments of this invention it will be obvious to those skilled in the art that various changes and modifications may be made therein without departing from the spirit of the invention, and it is, therefore, aimed to cover all such changes and modifications as fall within the scope and spirit of this invention.

Having thus described my invention what I claim and desire to protect by Letters Patent is:

1. A positive drive system comprising: a flexible belt having a tensile member; curvilinear teeth secured to said tensile member and at least one pulley having mating substantially conjugate teeth wherein said belt teeth have a longitudinal cross-sectional contour which approximates the contour of the ½ order isochromatic fringe in the belt when said tooth is under rated load.

2. A positive drive system according to claim 1 wherein said pulley and belt teeth are of such dimensions that within a belt tooth which is under rated load and in contact with a mating pulley tooth, the isochromatic fringes are located substantially parallel to the tensile member in the region immediately adjacent to the tensile member.

3. A positive drive system according to claim 1 wherein said pulley and belt teeth are of such dimensions that within a belt tooth which is under rated load and in contact with a mating pulley the isochromatic fringe order across the belt tooth along a line joining the tips of adjacent pulley teeth does not vary by more than four fringes.

4. A positive drive system according to claim 1 wherein said pulley and belt teeth are of such dimensions that within a belt tooth which is under rated load and in contact with a mating pulley tooth, the principal strains throughout at least seventy five percent of the longitudinal cross-sectional area of the belt tooth are in substantially the same direction.

5. A positive drive system according to claim 1 wherein said pulley and belt teeth are of such dimensions that within a belt tooth which is under rated load and in contact with a mating pulley tooth the value of the shear strain in a direction along a line joining the tips of adjacent pulley teeth for all points in the belt tooth along the said line varies by less than a factor of five.

6. A positive drive power transmission belt comprising: a flexible belt having a tensile member; elastomeric teeth of constant longitudinal cross-section secured to said tensile member; the longitudinal cross-sectional contour of the portion of each belt tooth farthest away from the tensile member being composed of two intersecting substantially circular arcs of equal radius, the height of the portion of each tooth within the confines of said arcs being at least sixty percent of the total tooth height as measured from said tensile member.

7. A power transmission belt according to claim 6 wherein the circular arcs of the belt teeth join with the arcs of adjacent teeth at points near the outer edge of said tensile member.

8. The power transmission belt of claim 6 wherein the said longitudinal cross-sectional contour of the belt tooth composed of two circular arcs approximates the contour of the ½ order isochromatic fringe in said tooth when said belt is under rated load.

9. A positive drive system comprising in combination a power transmission belt according to claim 6 and at least one pulley having mating, substantially conjugate teeth wherein the dimension of said belt and pulley teeth are such that within a belt tooth which is under its rated load and which is in contact with a mating pulley tooth the isochromatic fringes are oriented substantially parallel to the tensile member in the region immediately adjacent to the tensile member.

10. A positive drive system comprising in combination a power transmission belt according to claim 6 and at least one pulley having mating, substantially conjugate teeth wherein the dimensions of said belt and pulley teeth are such that within a belt tooth which is under rated load and which is in contact with a mating pulley the change in the isochromatic fringe order across the width of said belt tooth on a line joining the tips of adjacent pulley teeth, does not vary by more than four fringes.

11. A positive drive system comprising in combination a power transmission belt according to claim 6 and at least one pulley having mating, substantially conjugate teeth wherein the dimensions of said belt and pulley teeth are such that within a belt tooth which is under rated load and which is in contact with a mating pulley tooth, the principal strains throughout at least seventy five percent of the longitudinal cross-sectional area of said belt tooth are in substantially the same direction.

12. A positive drive system comprising in combination a power transmission belt according to claim 6 and at least one pulley having mating, substantially conjugate teeth wherein the dimensions of said belt and pulley teeth are such that within a belt tooth which is under rated load and which is in contact with a mating pulley tooth the value of the shear strain in a direction along a line joining the tips of adjacent pulley teeth for all points in the belt tooth along the said line varies by less than a factor of five.

13. A power transmission belt according to claim 6 wherein the belt tooth has roots with a longitudinal cross-sectional contour composed of substantially circular arcs having their centers of curvature outside of the belt tooth on a line parallel to the tensile member of said belt tooth when said tensile member is linearly positioned.

14. A power transmission belt according to claim 6 wherein each belt tooth has roots with a longitudinal cross-sectional contour composed of a substantially circular arc having its center of curvature located on the same line as the centers of curvature of the arcs which form the belt teeth when the belt is linearly positioned.

15. A power transmission belt according to claim 6 wherein each belt tooth has roots with a longitudinal cross-sectional contour composed of substantially circular arcs having their centers of curvature located on a line which is closer to the tensile member than a line that contains the centers of curvature of the arcs which form the belt tooth when the belt is linearly positioned.

16. A power transmission belt according to claim 15 wherein the ends of the belt teeth roots of adjacent belt teeth closest to the tensile member are joined by a land portion the edge of which is parallel to the tensile member when the tensile member is linearly positioned.

17. A power transmission belt according to claim 16 wherein the belt teeth are covered by a protective jacket and there is a layer of elastomeric material between the tension member and the jacket in the land area between the belt teeth.

18. A power transmission belt according to claim 6 wherein the belt teeth are covered by a protective jacket, said jacket having its splices cut on a bias such that each splice makes a minimum angle with the belt tooth such that if the splice starts at the point where one of the belt tooth roots blends with its land area the closest point that it will end is at the point on the other side of the tooth where the tooth's other root blends with its land area.

19. A power transmission belt according to claim 6 wherein the radii of curvature of the two substantially circular arcs are displaced from each other along a line parallel to the tensile member when said tensile member is linearly positioned by a distance not more than 20% of the length of said radii.

20. A power transmission belt according to claim 6 wherein the circular arcs of equal radius meet at a point and have centers of curvature displaced from each other on a line substantially parallel to said tensile member when said tensile member is linearly positioned.

21. A positive drive system comprising in combination a power transmission belt according to claim 6 and at least one pulley having mating, substantially conjugate teeth wherein said pulley teeth have tips, each tooth tip having longitudinal cross-sectional contours at least partially composed of two substantially circular arcs wherein said arcs have centers of curvature displaced from each other; and cavity portions composed of substantially circular arcs connecting the tips of adjacent pulley teeth.

22. The positive drive of claim 21 wherein the centers of curvature of said pulley teeth tips and said cavities are located on arcs which are radially displaced from and concentric with a circle connecting the outermost portion of the tips of the pulley teeth.

23. The positive drive of claim 22 wherein the radius of curvature of a pulley tooth, at any given point of contact with a belt tooth, is larger than the radius of curvature of a belt tooth at that point by an amount equal to or less than 10 percent of the belt tooth radius, and the center of curvature of the pulley tooth at any given point of contact is on the same side of the line of contact as the center of curvature of the belt tooth.

24. The positive drive of claim 22 wherein each belt tooth has roots with a curvilinear longitudinal contour and wherein a line drawn tangent to the outer edge of a belt tooth root at the point where the tooth root blends into said circular arcs which comprise the body of the tooth, makes an angle of less than 30° to a radial line running through the center of the tooth body.

25. The positive drive of claim 22 wherein a line drawn tangent to the edge of a pulley tooth at the point where the tip of the tooth blends into the body of said pulley tooth, makes an angle of less than 30° with the center line of the pulley tooth cavity.

26. The positive drive of claim 22 wherein each belt tooth has roots with a longitudinal cross-sectional contour composed of a circular arc and wherein the length of the radii of said root contour is less than 95% of the tip radii of the pulley teeth.

27. The positive drive of claim 26 wherein the distance across the belt tooth between the belt tooth roots which are closest to the tensile member, is approximately the distance given by the following equation:

$$L = (2T)/(\pi SdcN)$$

where
$L$ = tooth width between roots of the same tooth required at the tensile member elastomer interface,
$T$ = desired tensile capacity of belt,
$d$ = tensile member diameter,
$c$ = number of tensile members/unit length of belt width,
$N$ = minimum number of belt teeth in contact with the pulley,
$S$ = maximum shear stress that can be developed at the belt tooth-tensile member interface before separation.

28. The positive drive of claim 22 wherein the clearance between the outer tip of the belt tooth and said pulley cavity is not more than 10 percent of the distance between the pulley tip and the innermost point of the pulley cavity.

29. A positive drive power transmission belt comprising: an endless tensile member, and elastomer teeth of constant longitudinal cross-section secured to said tensile member, wherein the said longitudinal cross-sectional contour of the belt teeth is substantially that of a circular arc and the center of curvature of said arc is spaced from the center of the next tooth by a distance equal to or less than twice the radius of curvature of a belt tooth when said tensile member is linearly positioned.

30. A positive drive comprising in combination a power transmission belt according to claim 29 and at least one pulley having mating substantially conjugate teeth wherein the longitudinal cross-section contour of the pulley teeth is formed by the intersection of substantially circular arcs having their centers of curvature outside the body of the pulley.

31. The positive drive of claim 29 wherein the belt teeth are covered by a protective jacket, said jacket having splices cut on a bias such that each splice makes a minimum angle with the belt such that if the splice starts at the point where one of the belt teeth intersect an adjacent belt tooth, the closest point that it will end is the point on the other side of the tooth where the tooth intersects with the other belt tooth.

32. The positive drive of claim 30 wherein the radius of curvature of a pulley tooth at any given point of contact with a belt tooth is longer than the radius of curvature of a belt tooth by an amount equal to or less than 10 percent of the belt tooth radius and the center of curvature of the pulley tooth at any given point of contact is on the same side of the line of contact as the center of curvature of the belt tooth.

33. The positive drive of claim 30 wherein a line drawn tangent to the belt tooth at the point where the tooth root blends into the main portion of the belt tooth makes an angle of less than 30° with the line of symmetry running through the center of the tooth.

34. The positive drive of claim 30 wherein the width of the belt tooth is approximately the distance given by the following equation:

$$L = (2T)/(\pi SdcN)$$

where
- $L$ = tooth width between roots of the same tooth required at the belt tooth tensile member interface,
- $T$ = desired tensile capacity of the belt,
- $d$ = tensile member diameter,
- $c$ = number of tensile members/unit length of belt width,
- $N$ = minimum number of belt teeth in contact with the pulley,
- $S$ = maximum shear stress that can be developed at belt tooth-tensile member interface before separation.

35. The positive drive of claim 30 wherein the clearance between the outer tip of the belt tooth and said pulley cavity being not more than 10 percent of the distance between the pulley tip and the innermost point of the pulley cavity.

36. The positive drive of claim 30 wherein the longitudinal cross-sectional configuration of the belt tooth approximates the contour of the ½ order isochromatic fringe in said tooth when under rated load.

37. A toothed pulley for use in a positive drive system wherein the teeth have tips, each tip having a longitudinal cross-sectional contour at least partially composed of two substantially circular arcs, said arcs having centers of curvature displaced from each other and cavity portions composed of substantially circular arcs connecting the tips of adjacent teeth.

38. The toothed pulley of claim 37 wherein the centers of curvature of said pulley teeth tips and said cavities are located on arcs which are radially displaced from and concentric with a circle connecting the outermost portion of the tips of the pulley teeth.

39. A toothed pulley for use in a positive drive wherein the longitudinal cross-sectional contour of each of the pulley teeth is formed by the intersection of substantially circular arcs having their centers of curvature outside the body of the tooth.

40. A power transmission belt comprising: an endless tensile member and elastomer teeth of constant longitudinal cross-section secured to said tensile member, wherein the said longitudinal cross-sectional contour of the belt teeth is substantially that of a circular arc.

41. The positive drive of claim 22 wherein the centers of curvature of each of the arcs partially forming the toothed pulley tooth tips are located on the same side of the tooth as its respective arc.

42. The positive drive of claim 37 wherein the centers of curvature of each of the arcs partially forming the toothed pulley tooth tips are located on the same side of the tooth as its respective arc.

* * * * *

PO-1050
(5/69)

UNITED STATES PATENT OFFICE
CERTIFICATE OF CORRECTION

Patent No. 3,756,091    Dated January 4, 1974

Inventor(s) Henry F. Miller

It is certified that error appears in the above-identified patent and that said Letters Patent are hereby corrected as shown below:

Column 5, line 29, the numeral "1" should read --/--.

Column 16, lines 35, claim 42 the word "positive drive" should read --toothed pulley--.

Signed and sealed this 9th day of April 1974.

(SEAL)
Attest:

EDWARD M. FLETCHER, JR.
Attesting Officer

C. MARSHALL DANN
Commissioner of Patents